United States Patent [19]

Liet

[11] Patent Number: 4,846,034
[45] Date of Patent: Jul. 11, 1989

[54] APPARATUS FOR CUTTING SHEET-LIKE MATERIAL

[76] Inventor: Cornelis H. Liet, Denekamperdijk 38, 7581 PJ Losser, Netherlands

[21] Appl. No.: 59,547
[22] Filed: Jun. 8, 1987
[30] Foreign Application Priority Data Jun. 9, 1986 [NL] Netherlands .................. 8601485
May 1, 1987 [EP] European Pat. Off. ........ 87200818.0

[51] Int. Cl.$^4$ .................. B23D 33/08; B23D 33/10; B23D 15/06
[52] U.S. Cl. ........................... 83/157; 83/383; 83/456; 83/467 R; 83/460
[58] Field of Search ............ 83/104, 157, 460, 467 R, 83/467 A, 456, 383, 384

[56] References Cited

U.S. PATENT DOCUMENTS

| | | | |
|---|---|---|---|
| 3,115,801 | 12/1963 | Pearson et al. | 83/467 A |
| 3,194,098 | 7/1965 | Kimball et al. | 83/157 |
| 3,260,145 | 7/1966 | Gierdano | 83/157 |
| 3,631,750 | 1/1972 | Hanni | 83/157 |
| 3,779,116 | 12/1973 | Curtis et al. | 83/383 |
| 3,841,183 | 10/1974 | Van Zyl | 83/157 |
| 4,679,473 | 7/1987 | Hirata et al. | 83/467 R |

Primary Examiner—Frank T. Yost
Assistant Examiner—Scott A. Smith
Attorney, Agent, or Firm—Wolf, Greenfield & Sacks

[57] ABSTRACT

Apparatus for cutting sheet-like material, such as metal, comprising a frame (1), a table (2) for supporting the material plate to be cut, a fixed lower knife (3), an upper knife (4) movable up-and-down and cooperating with the lower knife, said upper knife including a cutting angle with the lower knife. The apparatus further comprises an adjustable stop (6) for determining the width of the material strip to be cut and a plurality of support arms (10) distributed along the length of the apparatus for lifting the fed part of the material plate, the support arms extending transverse to the lower knife and being adjacent to the lower knife with one end, the other end of each support arm being pivotably supported on a supporting beam (12). For each support arm a pressure spring (13) is provided, said support arms during a cutting action each being pivotably downwards by the upper knife against the action of the corresponding pressure spring, while clamping the material strip to be cut.

19 Claims, 9 Drawing Sheets

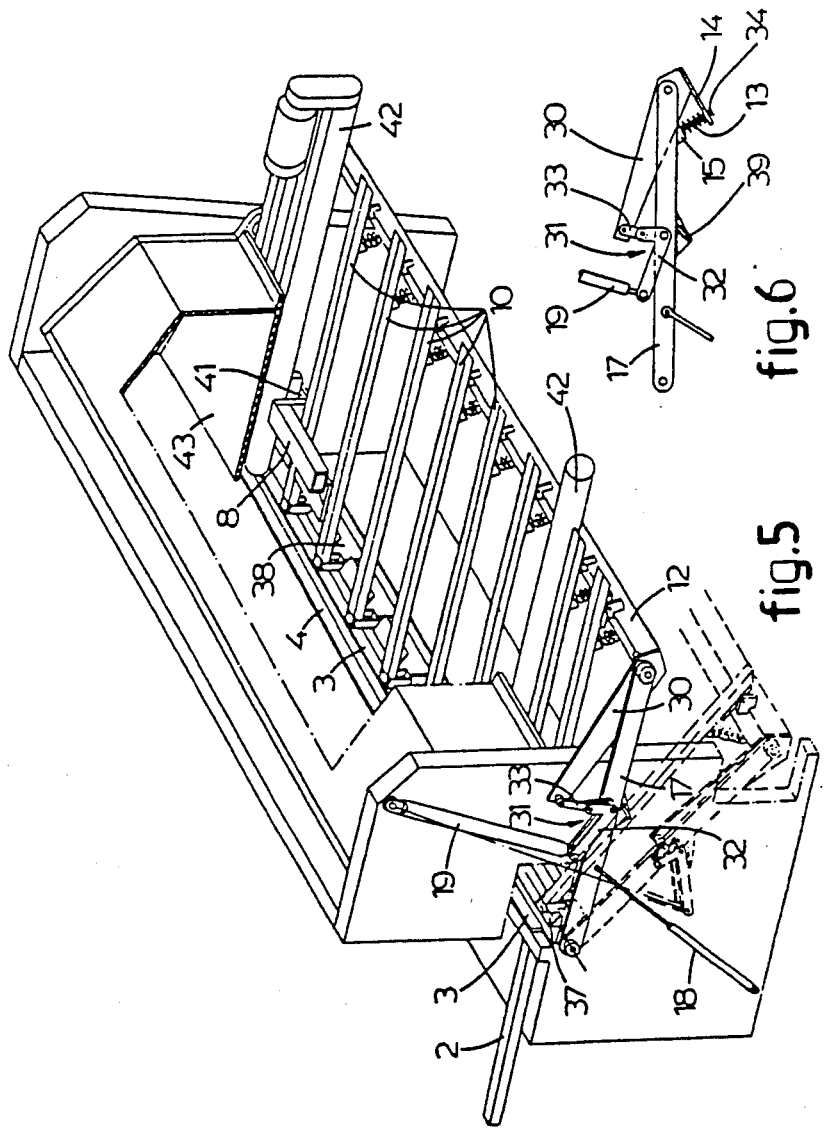

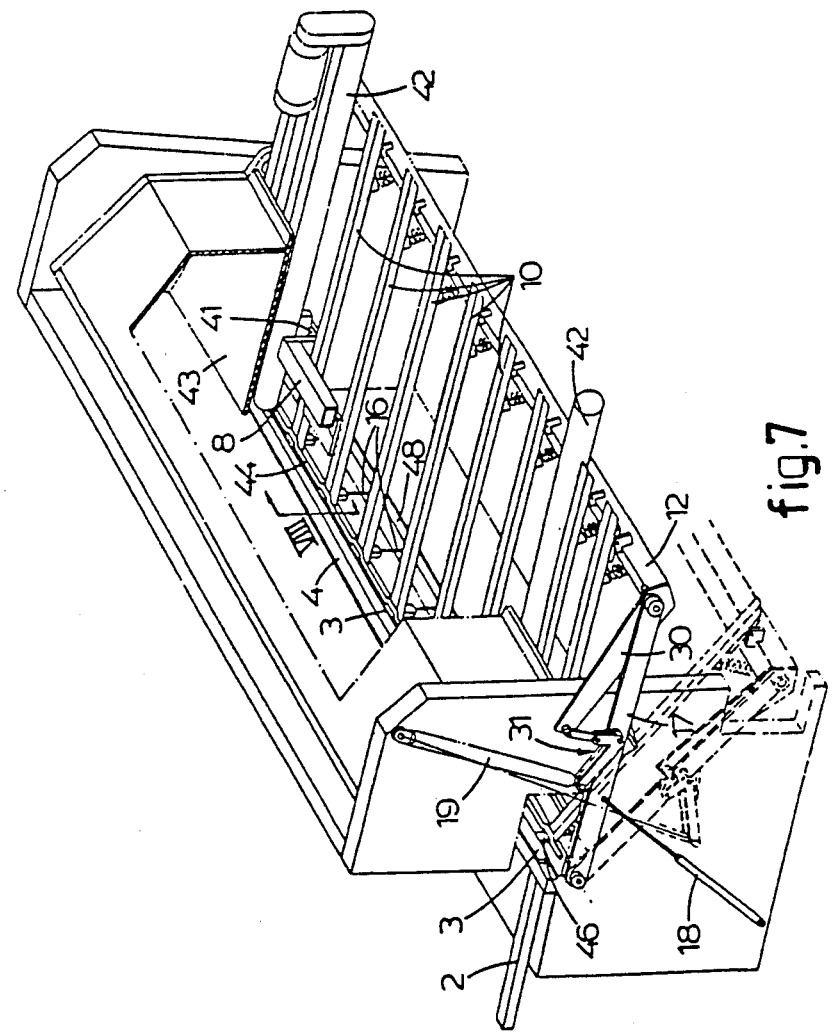

APPARATUS FOR CUTTING SHEET-LIKE MATERIAL

The invention relates to an apparatus for cutting sheet-like material, such as metal, comprising a frame, a table for supporting the material plate to be cut, a fixed lower knife, an upper knife movable up-and-down and cooperating with the lower knife, said upper knife including a cutting angle with the lower knife, an adjustable stop for determining the width of the material strip to be cut and lifting means for lifting the fed part of the material plate.

Such an apparatus is suitable for cutting strips of widely different width by adjusting the stop at the desired width of the material strip to be cut. The lifting means provides for the security that during feeding the material plate the end edge strikes the stop and cannot be shoven underneath the stop. For carrying out the cutting operation the lifting means is moved downwardly. The known apparatus shows the problem, that in particular when cutting narrow material strips, the cut material strip is strongly deformed and thereby hard to be further worked. Moreover, the width dimension along the length of the cut material strip is not constant.

FR-A-No. 1.441.501 describes an apparatus of the above-mentioned type, wherein it is attempted to meet these disadvantages by providing a plurality of support means narrow in transverse direction and distributed along the length of the lower knife, which support means are spring-mounted in vertical direction and clamp a material strip to be cut against the upper knife during a cutting action. The provision of extra support means increases, however, the cost price of the apparatus. Further it is a significant problem to discharge the cut material strip at this known apparatus, whereas a wide material strip is not sufficiently supported. Moreover, the deformation of the cut material strip is not sufficiently counteracted with this known apparatus.

The invention aims to provide an apparatus of the above-mentioned kind, wherein said disadvantages are obviated in a simple but nevertheless effective manner.

To this end the apparatus according to the invention is characterized in that said lifting means comprises a plurality of support arms distributed along the length of the apparatus, said support arms extending transverse to the lower knife and being adjacent to the lower knife with one end, the other end of each support arm being pivotably supported on a supporting beam, in that a pressure means is provided for each support arm, and in that said support arms during a cutting action each are pivotable downwards by the upper knife against the action of the corresponding pressure means while clamping the material strip to be cut.

In this manner the lifting means is advantageously used also as support means, clamping the material strip against the upper knife during a cutting action and also supporting the material strip along its whole width. Because the support arms are pivotably supported at their end opposite of the lower knife, the material strip to be cut is slightly twisted during the cutting action in a direction opposite to the direction in which the material strip is bent by the cutting. Thereby a deformation of the cut material strip is completely prevented and a very high accuracy of the width of the cut material strip is guaranteed.

Preferably, the supporting beam is provided on both sides with pivot arms pivotably connected with the frame of the apparatus, wherein the supporting beam can be pivoted downwardly on both sides by an actuating means for discharging the cut material strip.

According to a favourable embodiment of the invention the pressure means of each support arm comprises a double acting cylinder piston assembly mounted between said one end of the corresponding support arm and the frame.

The side of the cylinder piston assemblies loaded during the cutting movement of the upper knife, is connected with the hydraulic system through a pressure valve, so that the clamping force, by which the material strip to be cut is held, can be easily adjusted.

According to a very favourable embodiment there are means for energizing the cylinder piston assemblies of the support arms for displacing the ends of the support arms adjacent the lower knife to their lowest position at the end of the downward movement of the upper knife. Thereby the cut material strip can already be discharged during the return stroke of the upper knife, whereby the operation speed of the apparatus is strongly increased.

The invention will be further explained by reference to the drawings, in which some embodiments of the apparatus according to the invention are shown.

FIG. 1 schematically shows a cross-section of an embodiment of the apparatus according to the invention according to the line I—I of FIG. 2.

FIG. 2 schematically shows a back view of the apparatus according to FIG. 1.

FIG. 5 is a schematically and partly shown perspective view of a second embodiment of the apparatus according to the invention.

FIG. 6 is a side view of a part of the apparatus of FIG. 5.

FIG. 7 is a perspective view of a third embodiment of the apparatus according to the invention.

Figure 10:
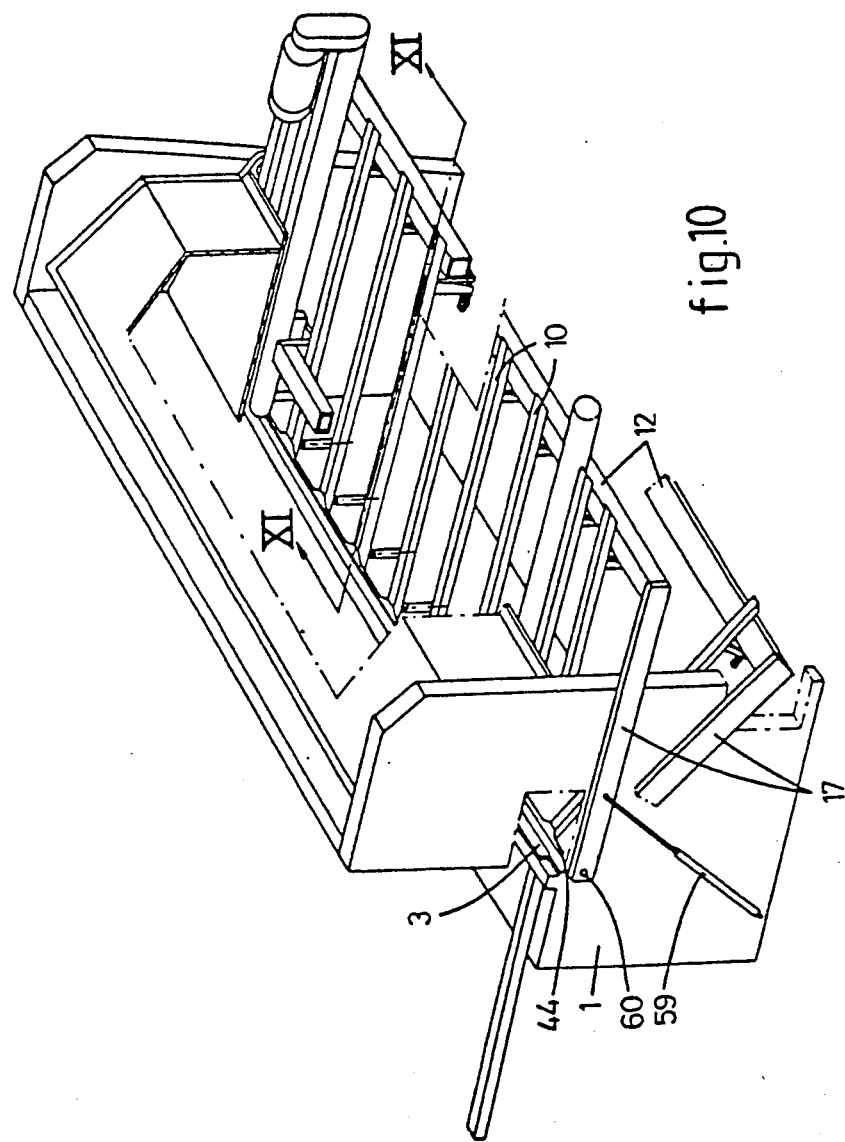
FIG. 10 is a perspective view of a fourth preferably used embodiment of the apparatus according to the invention.
Figure 11:
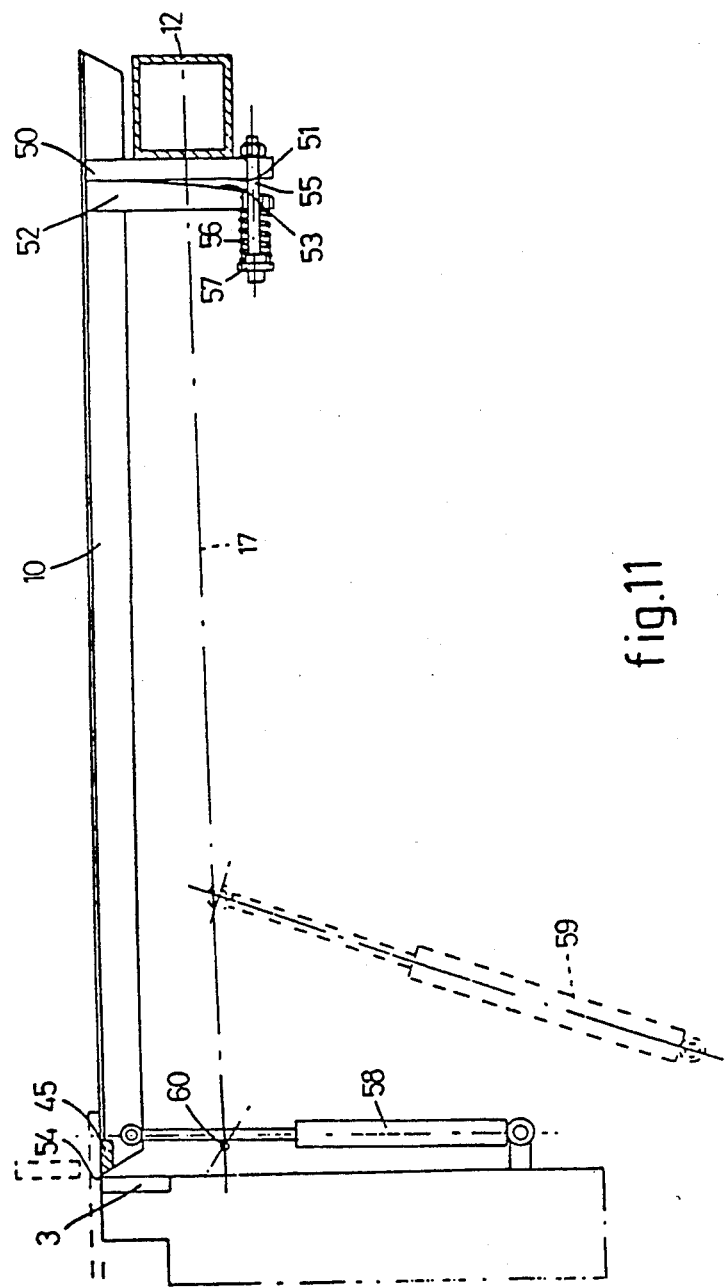

FIG. 11 schematically shows a cross-section according to the line XI—XI of FIG. 10, in which one support arm is shown.

Figure 12:
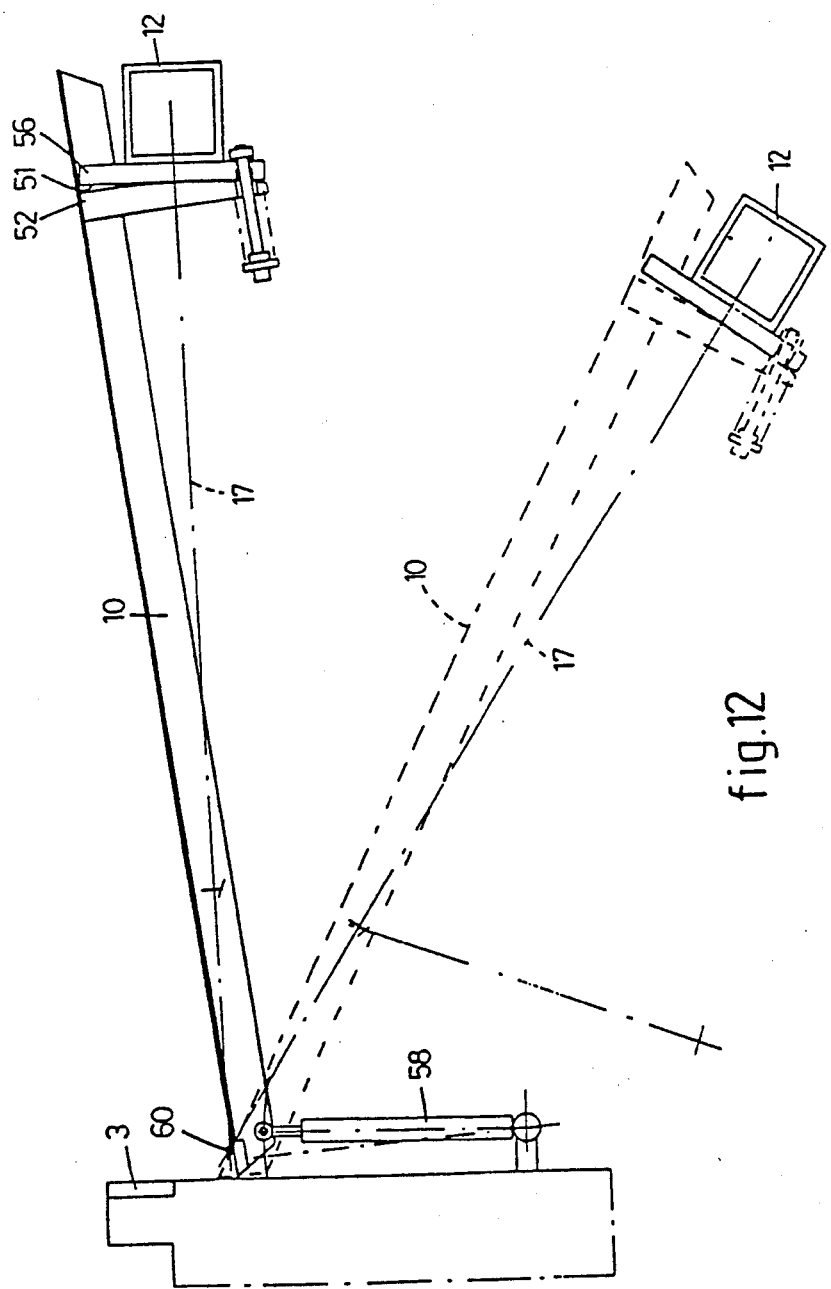

FIG. 12 is a cross-section corresponding with FIG. 11, in which the support arm is shown in an end position and in the discharge position.

Figure 1:
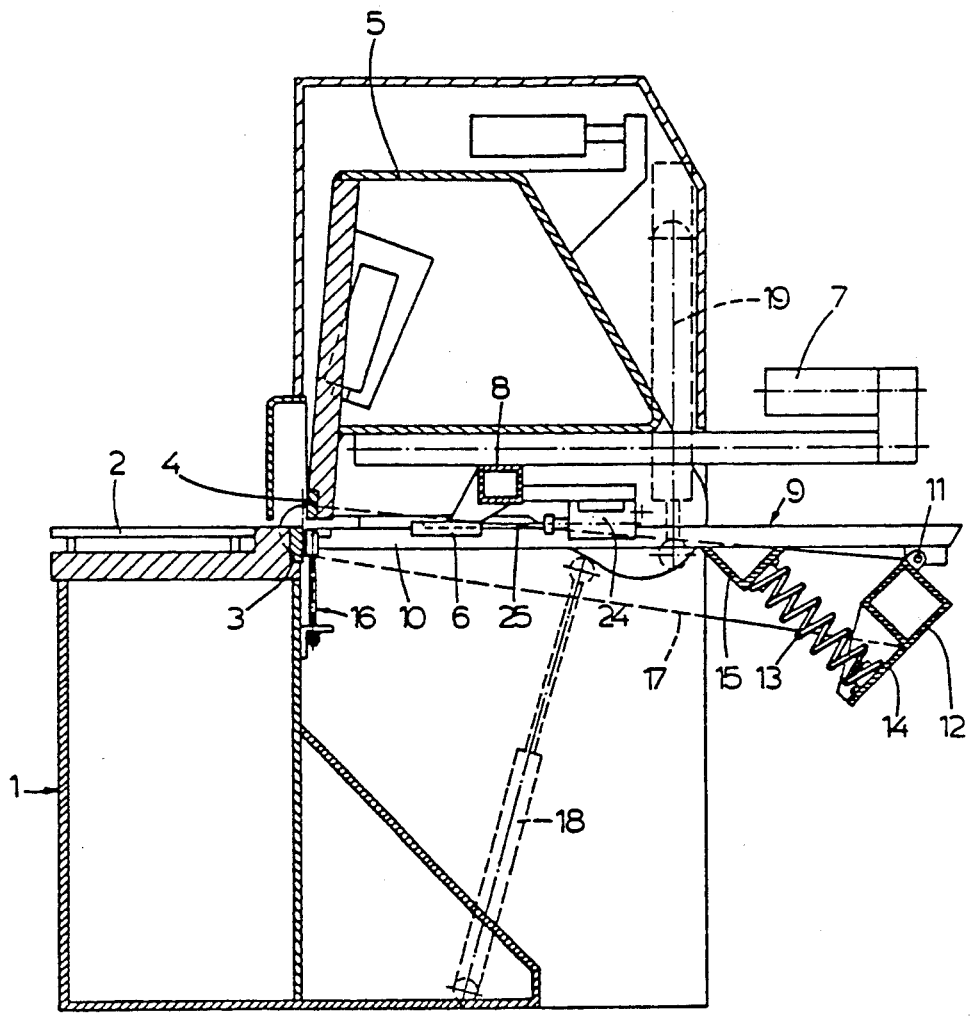
Figure 2:
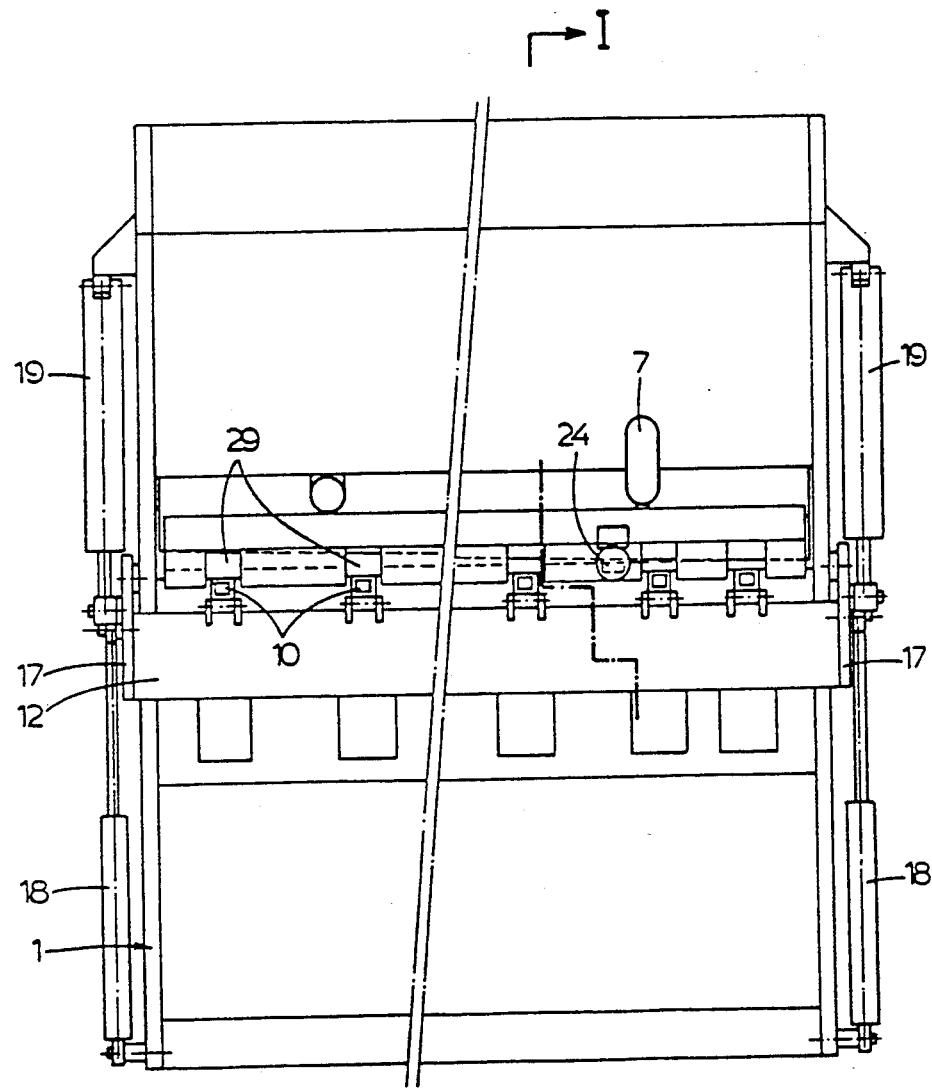

Referring to FIGS. 1 and 2, there is schematically shown an apparatus for cutting sheet-like material, such as metal, comprising a frame 1 with a table 2 for supporting the material plate to be worked (not shown). In one end edge of the table 2 a fixed lower knife 3 is mounted cooperating with an upper knife 4, which is movable downwardly. The upper knife 4, including a cutting angle with the lower knife 3, is fixed to an upper knife carrier 5, rotatably mounted in the frame 1.

The upper knife carrier 5 further comprises an adjustable stop 6, by means of which the width of the material strip to be cut can be determined. To this end the stop 6 is movable transverse to both knifes 3,4, by means of a drive motor 7, driving a stop beam 8 through screwed spindles in a manner not further shown.

The apparatus is further equipped with lifting means 9 for lifting the fed part of the material plate. Thereby it is guaranteed that the fed end edge strikes the stop 6 with security and cannot shift underneath the stop. In the apparatus shown in the drawings the lifing means 9 comprises a plurality of support arms 10 distributed along the length of the apparatus, which support arms 10 extend transverse to the lower knife 3, wherein one end of all support arms 10 is adjacent the lower knife 3. The other end of each support arm 10 is connected with a supporting beam 12 pivotably on a hinge pin 11 and each support arm 10 is supported on the supporting beam 12 through a pressure spring 13. To this end the supporting beam is provided with a flange plate 14 and each support arm 10 has a mounting support 15. The pressure spring 13 is clamped between said both parts 14,15. The support arms 10 each are maintained in a substantially horizontal rest position shown in FIG. 1 by a stop element 16 with tensioned pressure spring 13. During a cutting action the support arms 10 are pivoted downwardly around the hinge pin 11 by the upper knife 4 against the action of the pressure spring 13. The material strip to be cut is supported by the support arms 10 and is clamped between the upper knife 4 and the support arms 10, whereby deformation of the cut material strip is prevented and the width of the cut material strip meets accurately the desired dimension along its whole length.

The hinge pins 11 of the support arms 10 are at a distance from the upper side of the lower knife 3 corresponding substantially with half the cutting stroke of the upper knife 4. The cutting stroke of the upper knife 4 is the distance along which the upper knife 4 is moved from the moment at which the upper knife 4 just contacts the material plate to be cut. Thereby it is obtained that the gap between the ends of the support arms 10 and the lower knife 3 remains as small as possible along the whole cutting stroke of the upper knife 4.

The supporting beam 12 is provided at each end with a pivot arm 17, pivotably connected with the frame 1 at its end opposite of the supporting beam 12. The pivot axis, around which the pivot arms 17 are pivotable, substantially coincides with the cutting line of the lower knife 3. Between each pivot arm 17 and the frame 1 a spring means is provided, which spring means 18 keep the pivot arms 17 and thereby the supporting beam 12 with support arms 10 in the rest position shown. The pivot arms 17 can be pivoted downwardly by means of actuating means made as cylinder piston assemblies 19. By pivoting downwardly the supporting beam 12 the support arms 10 get into a discharge position, in which they extend obliquely downwardly and which is partly shown in FIG. 3. Thereby the cut material strip can be discharged at the backside of the apparatus.

Figure 3:
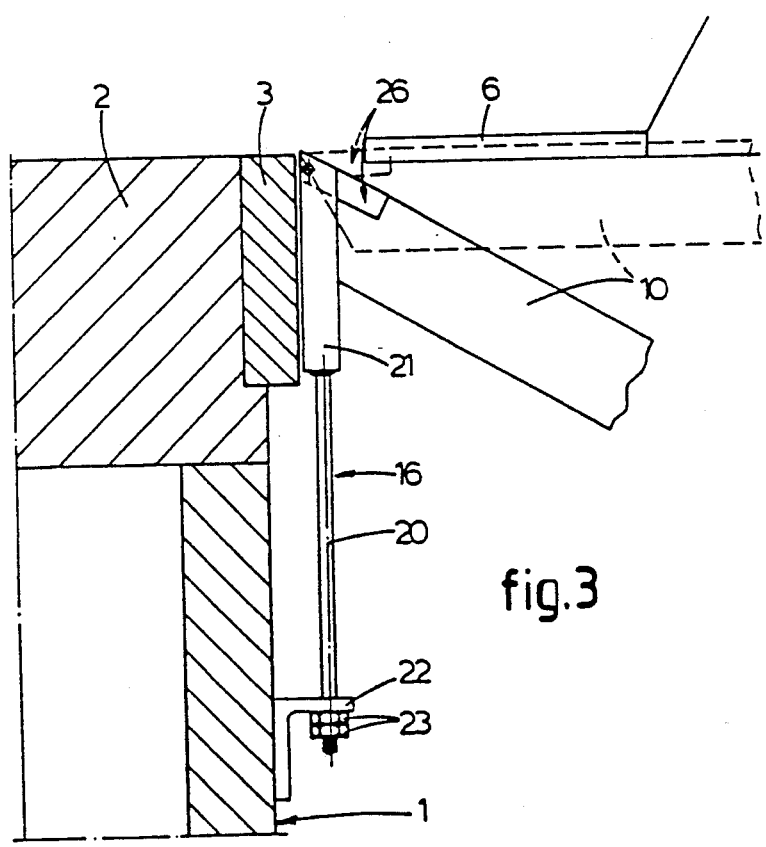
FIG. 3 is a partly shown cross-section of the apparatus of FIG. 1 on a larger scale.

For cutting narrow material strips, wherein the stop 6 is closely spaced from the lower knife 3, as shown in FIG. 3, it is of importance that the fastening point of the stop element 16 of each support arm 10 is adjacent the lower knife 3. The stop elements are rotatably connected with the end of the corresponding support arms adjacent the lower knife 3, wherein the respective rotation axis is at a distance from the cutting line of the lower knife 3, which is at the utmost equal to half the width of the lower knife 3. Thereby sufficient space will remain between the upper side of the support arms 10 and the stop 6 in the obliquely downwardly directed position for discharging the cut material strip.

Figure 4:
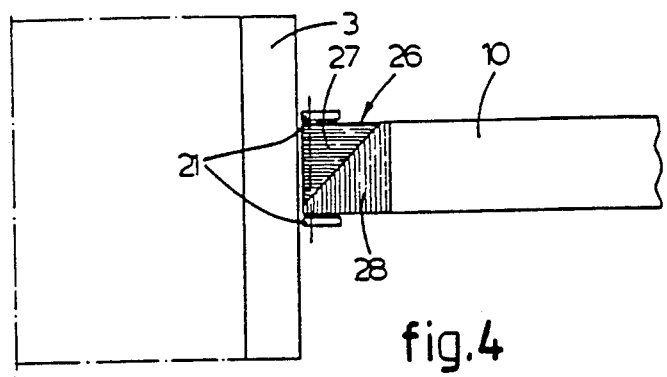
FIG. 4 is a partly shown top view of a support arm and the lower knife of the apparatus of FIG. 1.

As shown in FIGS. 3 and 4, each stop element consists of a rod 20 with a fork-shaped end part 21, rotatably connected with the support arm 10. The end of the rod 20 opposite of the support arm 10 is guided in a bracket 22 mounted on the frame 1, and carries a pair of nuts 23 cooperating with the bracket 22. The nuts 23 function as an adjustable stop means for determining the rest position of the support arm 10.

With the apparatus shown in FIG. 1 the discharge may take place at the frontside of the apparatus instead of a discharge of the cut material strip at the backside of the apparatus. To this end at least one return means 24 is provided, by means of which a cut material strip can be shoven back on the table 2. The return means 24 consists of a cylinder piston assembly suspended on the stop beam 8. In the stop 6 a passage is formed for the piston rod 25 of the cylinder piston assembly. By energizing the cylinder piston assembly 24 the piston rod 25 shifts the cut material strip along the support arms 10 on the table 2.

In order to prevent the cut material strip from striking the lower knife 3 at returning to the table 2, in the rest position the upper face of the support arms 10 lies just above the upper face of the lower knife 3. The end part 26 of each support arm 10 adjacent the lower knife extends obliquely from the upper face of the support arms 10 to the upper face of the lower knife 3. This end part 26 of the support arm 10 consists of a substantially rectangular plate mounted on the support arms 10, the upper face of which is divided substantially diagonally in two triangular faces 27 and 28. In a section transverse to the support arms 10 the face 27 extends substantially horizontal, whereas the face 28 extends parallel to the upper knife 3. Thereby it is obtained that the end part 26 of each support arm 10 supports the material strip to be cut with a flat face 27 on the one side and supports the material strip to be cut during the cutting action with a flat face 28 on the other side.

The adjustable stop 6 of the described apparatus is provided with a recess 29 at the location of each support arm 10, which recess is sufficiently big to receive the support arm during the cutting action. Thereby the adjustable stop 6 can be attached to the upper knife carrier 5 in the usual manner.

The length of the support arms 10 is at least equal to the maximum width at which the adjustable stop 6 can be adjusted, so that for each adjustment of the stop 6 a good support of the material to be cut is guaranteed.

FIGS. 5 and 6 show a favourable embodiment of the apparatus according to the invention, which for the main part corresponds with the apparatus according to FIGS. 1-4 and wherein corresponding parts are indicated by the same reference numbers.

In the apparatus according to FIGS. 5 and 6 the supporting beam 12 is pivotably borne in the pivot arms 17. The supporting beam 12 is further provided on both sides with an actuating arm 30, each actuating arm 30 being coupled to the corresponding actuating means 19 by a lever assembly 31. This lever assembly 31 comprises a fork-shaped lever 32 and a straight lever 33. The one leg of the forkshaped lever 32 is rotatably connected with the actuating means 19, whereas the other leg is connected to the corresponding actuating arm 30 through the straight lever 33. The joining part of both legs of the fork-shaped lever 32 is rotatably attached to the corresponding pivot arm 17.

In this embodiment the support arms 10 each are coupled to the supporting beam 12 by a coupling rod 34. The coupling rods 34 are hingedly mounted on the mounting supports 15 and extend through a corresponding opening in the flange plate 14, wherein the end projecting through the flange plate 14 carries a widened head part.

Below the lower knife 3 a cam-shaped guiding plate 37 is mounted, which guiding plate 37 is provided with recesses 38 in which the ends of the support arms 10 adjacent the lower knife 3 can be received, as will be explained hereinafter.

The apparatus according to FIGS. 5 and 6 has the important advantage that the discharge of the cut material strip can take place even before the upper knife 4 has been moved back again to its starting or rest position. As soon as the material strip is cut, the actuating means 19 are energized, whereby the fork-shaped levers 32 will rotate around the fixed rotation point on the pivot arm 17 and the supporting beam 12 will pivot in the pivot arms 17 by means of the actuating arms 30. Thereby first the pressure springs 13 will partially release and subsequently the head parts of the coupling rods 34 will strike the flange plate 14, so that the ends of the support arms 10 adjacent the lower knife 3 are pivoted to an end position by the coupling rods 34. In this end position said ends of the support arms 10 are received in the recesses 38 of the guiding plate 37, so that the cut material strip will be lying at least partially on the guiding plate 37. During the further power stroke of the actuating means 19 the fork-shaped levers 32 strike a stop 39 of the pivot arms 17, so that the pivot arms 17 are pressed downwardly and the supporting beam 12 is pivoted downwardly to the discharge position indicated in FIG. 5 by a dashed line. Thereby the cut material strip will slide downwardly along the support arms 10 and will be discharged. Subsequently the actuating means 19 may be de-energized and the pivot arms 17 with the supporting beam 12 and the support arms 10 are moved backwards to the shown rest position by the spring means 18.

It will be clear that the possibility to discharge the cut material strip during the return movement of the upper knife 4 already, significantly increases the speed of operation of the apparatus.

Although a return means for returning the cut material strip on the table 2 is not shown in FIG. 5, the apparatus of FIGS. 5 and 6 may of course also be equipped with such a return means 24.

The stop beam 8 of the apparatus according to FIGS. 5 and 6 is provided with two substantially U-shaped recesses 41, only one of which being shown in FIG. 5. Tubes 42 extend through these recesses 41, the screwed spindles for moving the stop beam 8 being mounted in these tubes. Thereby a support plate 43 providing the upper knife 4 with the required rigidity in transverse direction, can be mounted at a short distance above the upper knife 4 despite the elevated mounting of the stop beam 8 caused by the presence of the support arms 10.

Figure 9:
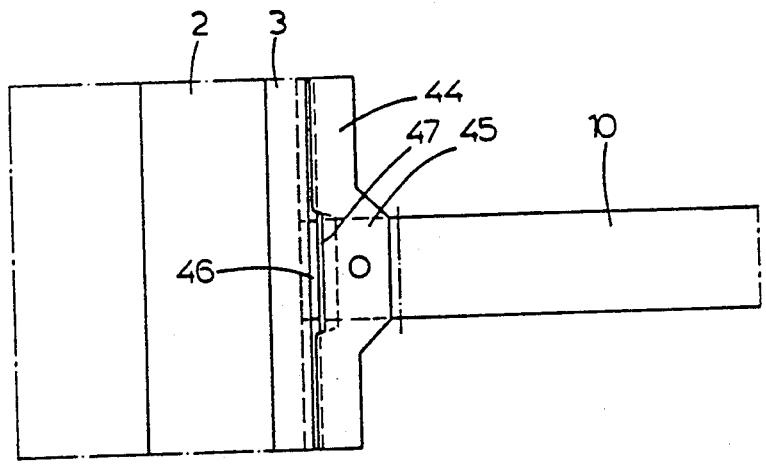
FIG. 9 is a partly shown top view of the support arm and the lower knife of the apparatus of FIG. 7.
Figure 8:
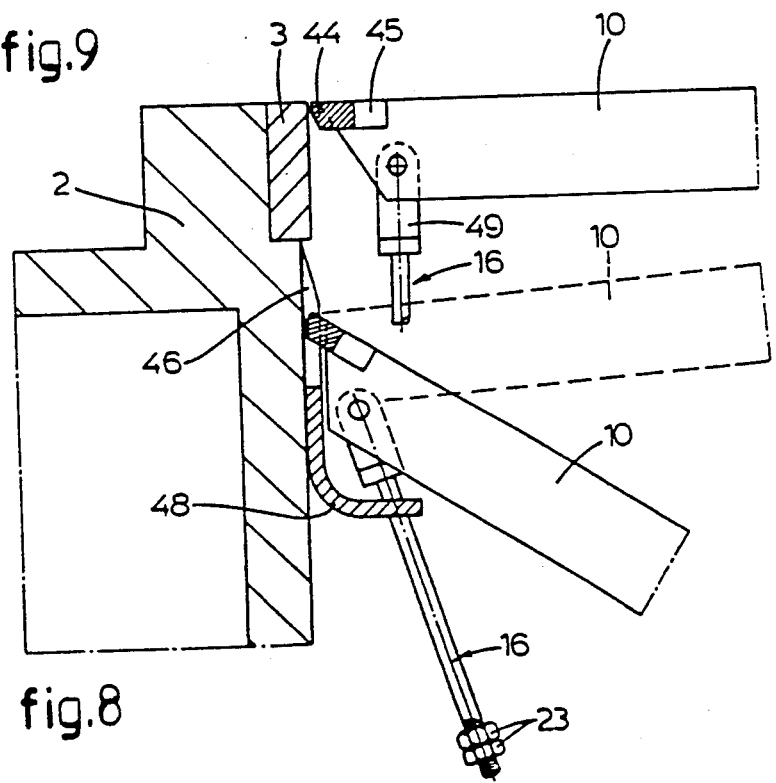
FIG. 8 is a partly shown cross-section of the apparatus of FIG. 7 according to the line VIII—VIII on a larger scale.

FIGS. 7-9 show a third embodiment of the apparatus according to the invention, which mainly corresponds with the embodiment of FIGS. 5 and 6. Corresponding parts are again indicated by the same reference numbers.

In the embodiment of FIGS. 7-9 the support arms 10 are interconnected by a strip-like spring element 44, having a widening 45 at the location of each support arm 10, by means of which widening the spring element 44 is fixed to the support arms 10. By means of this strip-like spring element 44 a perfect flat support of the material strip to be cut is obtained and, if desired, a smaller plurality of support arms 10 would be enough.

Instead of the cam-shaped guiding plate at the apparatus of FIGS. 5 and 6, a protection plate 46 is mounted at the location of each support arm 10 in the apparatus according to FIGS. 7-9, which protection plate exactly fits in a recess 47 in the spring element. Thereby it is prevented that, when the support arms 10 are pivoted downwardly, a narrow material strip could slide between the support arms 10 and the table 2.

A bracket 48 is mounted below the protection plate 46, said bracket cooperating in the same manner as the bracket 22 at the apparatus of FIGS. 1-4 with the nuts 23 of the stop elements 16. In this case the stop elements 16 have a substantially rectangular end part 49, rotatably mounted in the U-shaped end of the support arms 10.

The operation of the apparatus according to FIGS. 6-9 fully corresponds with the operation of the apparatus according to FIGS. 5 and 6. In FIG. 8 a support arm 10 is shown in the rest position and indicated with a dashed line in the end position and, moreover, shown in the discharge position, in which the supporting beam 12 is pivoted downwardly. The axis, around which the pivot arms 17 pivot downwardly, in this case substantially coincides with the upper end of the support arms 10, when these support arms are in their end position shown by a dashed line.

Although not shown in the drawings, transport means may be mounted in the support arms 10 for transporting a cut material strip in a direction directed away from the lower knife 3, as soon as the upper knife 4 is in the rest position again. Thereby the cut material strip can be discharged without the supporting beam 12 being pivoted downwardly.

FIGS. 10-12 show a fourth embodiment of the apparatus according to the invention corresponding with the apparatus of FIGS. 7-9. In this fourth embodiment the support arms 10 are interconnected by a strip-like spring element 44, having the widening 45 at the location of the fixation to each support arm 10.

In the apparatus according to FIGS. 10-12 the support arms 10 are not pivotably connected by a hinge pin 11 to the supporting beam 12, but the end opposite of the lower knife 3 is only pivotably supported on the supporting beam 12. The supporting beam 12 comprises at the location of each support arm 10 a carrier 50 with a guiding face 51 (see FIGS. 11 and 12), whereas each support arm 10 has a support 52 with a cylindrical surface 53. The guiding face 51 extends parallel to the lower knife 3, whereas the centre of the cylindrical surface 53 lies on end edge 54 of the corresponding support arm 10 adjacent the lower knife 3.

A coupling rod 55 extends between the carrier 50 and the support 52, a spring 56 being provided under tension between a flange 57 and the support 52. Thereby the spring 56 always maintains the contact between the guiding face 51 and the cylindrical surface 53. During the cutting movement, during which the support arms 10 are moved from the horizontal rest position shown in FIG. 11 to the end position shown in FIG. 12, the cylindrical surface 53 rolls on the guiding face 51, so that the space between the end edge 54 and the lower knife 3 does not vary and remains minimal. Thereby there is no danger that material becomes clamped between the support arms 10 and the lower knife 3.

The force for clamping the material strip to be cut is generated in the apparatus according to FIGS. 10–12 by pressure means made as double-acting cylinder piston assemblies 58, mounted between the frame 1 and the end of the support arms 10 adjacent the lower knife 3. The side of the cylinder piston assemblies 58 loaded during the cutting action is connected to the hydraulic system of the apparatus through a pressure valve not shown and adjustable at a desired pressure. Thereby the clamping force can be easily adjusted.

As soon as the cutting movement is ended, all cylinder piston assemblies 58 are energized by suitable means not further shown in such a manner, that all support arms 10 go to the end position shown in FIG. 12 by a non-dashed line. Subsequently these means energize cylinder piston assemblies 59 mounted on both sides of the apparatus and only one of which being shown in FIG. 10. The cylinder piston assemblies 59 move the pivot arms 17 and thereby the supporting beam 12 downwardly to the discharge position partly shown in FIG. 10. In FIG. 12 this discharge position of the supporting beam 12 is also shown, wherein the support arm 10 is indicated by a dashed line. The cut material strip can then slide downwardly along the support arms 10. The axis around which the pivot arms 17 pivot downwardly substantially coincides with the end of the support arms 10, when these support arms are in their end position shown in FIG. 12, i.e. when the cylinder piston assemblies 58 have pulled the ends of the support arms 10 adjacent the lower knife 3 in their lowest position. This axis is schematically indicated by 60.

Of course the supporting beam 12 can be pivoted downwardly by the cylinder piston assemblies 59 over each desired angle, so that, for example, a stack of cut products can be formed behind the apparatus.

As in the above-described embodiments transport means can be provided in the support arms 10 for discharging the cut material strip.

Although the supporting beam 12 is only pivoted downwardly for discharging the cut material strip in the described embodiments, the supporting beam 12 can be moved downwardly in an other manner also.

The invention is not restricted to the abovedescribed embodiments, which can be varied in a number of ways within the scope of the invention.

What is claimed is:

1. Apparatus for cutting sheet-like material, such as metal, comprising a frame, a table for supporting a material plate to be cut, a fixed lower knife, an upper knife movable up-and-down and cooperating with the lower knife, said upper knife including a cutting angle with the lower knife, an adjustable stop for determining the width of a material strip to be cut and lifting means for lifting a fed part of the material plate, wherein said lifting means comprises a plurality of support arms distributed along the length of the apparatus, said support arms extending transverse to the lower knife and being adjacent to the lower knife with one end, the other end of each support arm being pivotably supported on a supporting beam in such as manner that the support arms are adapted to support the material strip to be cut along the whole width of said strip, a pressure means being provided for each support arm, and said support arms during a cutting action each being pivotable downwards by the upper knife against the action of the corresponding pressure means while clamping the material strip to be cut thereby preventing deformation of the material strip to be cut.

2. Apparatus according to claim 1, wherein the supporting beam is provided on both sides with pivot arms pivotably connected with the frame of the apparatus, wherein the supporting beam can be pivoted downwardly on both sides by an actuating means for discharging the cut material strip.

3. Apparatus according to claim 1, wherein the other end of each support arm is pivotably connected by a hinge pin with the supporting beam, wherein the hinge pins of the support arms lie at a distance below or above the upper side of the lower knife, which is at the utmost equal to the half of the cutting stroke on the upper knife.

4. Apparatus according to claim 1, wherein the pressure means of each support arm comprises a spring means by which the corresponding support arm is supported on the supporting beam, wherein the support arms each are maintained in a substantially horizontal rest position by a stop element at tensioned spring means.

5. Apparatus according to claim 1, wherein the pressure means of each support arm comprises a double acting cylinder piston assembly mounted between said one end of the corresponding support arm and the frame.

6. Apparatus according to claim 1, further comprising a return means for returning a cut material strip to the table.

7. Apparatus according to claim 1, wherein the support arms are connected to each other by a strip-like spring element at their ends adjacent the lower knife.

8. Apparatus for cutting sheet-like material, such as metal, comprising a frame, a table for supporting a material plate to be cut, a fixed lower knife, an upper knife movable up-and-down and cooperating with the lower knife, said upper knife including a cutting angle with the lower knife, an adjustable stop for determining the width of a material strip to be cut and lifting means for lifting a fed part of the material plate, wherein said lifting means comprises a plurality of support arms distributed along the length of the apparatus, said support arms extending transverse to the lower knife and being adjacent to the lower knife with one end, the other end of each support arm being pivotably supported on a supporting beam, a pressure means being provided for each support arm, and said support arms during a cutting action each being pivotable downwards by the upper knife against the action of the corresponding pressure means while clamping the material strip to be cut, wherein the supporting beam is rotatably borne in the pivot arms and includes on both sides an actuating arm coupled with an actuating means for rotating the supporting beam in pivot arms, wherein each support arm is coupled to the supporting beam by a coupling rod, which coupling rods cause the ends of the support arms adjacent the lower knife to pivot downwardly to an end position at the rotation of the supporting beam.

9. Apparatus according to claim 8, wherein the actuating arms of the supporting beam each are coupled to the actuating means by a lever assembly for pivoting downwardly the supporting beam.

10. Apparatus according to claim 9, wherein each lever assembly comprises a fork-shaped lever, one leg of which is rotatably connected with the corresponding actuating means, the other end of which is connected through a straight lever with the corresponding actuating arm, wherein the fork-shaped lever is rotatably fixed to the corresponding pivot arm in the joining part of both legs, and in that each pivot arm is provided with a stop adapted to cooperate with the lever assembly for pivoting downwardly the supporting beam.

11. Apparatus for cutting sheet-like material, such as metal, comprising a frame, a table for supporting a material plate to be cut, a fixed lower knife, an upper knife movable up-and-down and cooperating with the lower knife, said upper knife including a cutting angle with the lower knife, an adjustable stop for determining the width of a material strip to be cut and lifting means for lifting a fed part of the material plate, wherein said lifting means comprises a plurality of support arms distributed along the length of the apparatus, said support arms extending transverse to the lower knife and being adjacent to the lower knife with one end, the other end of each support arm being pivotably supported on a supporting beam, a pressure means being provided for each support arm, and said support arms during a cutting action each being pivotable downwards by the upper knife against the action of the corresponding pressure means while clamping the material strip to be cut, wherein the supporting beam comprises a guiding face at the location of each support arm, said guiding faces extending parallel to the lower knife, while each support arm comprises a support with cylindrical surface near its end supported on the supporting beam, which cylindrical surface cooperates with the corresponding guiding face of the supporting beam, wherein the center of the cylindrical surface substantially coincides with the end edge of the corresponding support arm adjacent the lower knife.

12. Apparatus according to claim 11, wherein each guiding face of the supporting beam and the cylindrical surface of the corresponding support arm are maintained in contact with each other by a spring.

13. Apparatus for cutting sheet-like material, such as metal, comprising a frame, a table for supporting a material plate to be cut, a fixed lower knife, an upper knife movable up-and-down and cooperating with the lower knife, said upper knife including a cutting angle with the lower knife, an adjustable stop for determining the width of a material strip to be cut and lifting means for lifting a fed part of the material plate, wherein said lifting means comprises a plurality of support arms distributed along the length of the apparatus, said support arms extending transverse to the lower knife and being adjacent to the lower knife with one end, the other end of each support arm being pivotably supported on a supporting beam, a pressure means being provided for each support arm, and said support arms during a cutting action each being pivotable downwards by the upper knife against the action of the corresponding pressure means while clamping the material strip to be cut, wherein the upper face of the support arms extending substantially horizontal in the rest position lies just above the upper face of the lower knife, wherein the end part of each support arm adjacent the lower knife extends obliquely from the upper face of the support arms to the upper face of the lower knife.

14. Apparatus for cutting sheet-like material, such as metal, comprising a frame, a table for supporting a material plate to be cut, a fixed lower knife, an upper knife movable up-and-down and cooperating with the lower knife, said upper knife including a cutting angle with the lower knife, an adjustable stop for determining the width of a material strip to be cut and lifting means for lifting a fed part of the material plate, wherein said lifting means comprises a plurality of support arms distributed along the length of the apparatus, said support arms extending transverse to the lower knife and being adjacent to the lower knife with one end, the other end of each support arm being pivotably supported on a supporting beam, a pressure means being provided for each support arm, and said support arms during a cutting action each being pivotable downwards by the upper knife against the action of the corresponding pressure means while clamping the material strip to be cut, wherein the support arms are connected to each other by a strip-like spring element at their ends adjacent to the lower knife and wherein the spring element has a recess at the side of the lower knife at the location of each support arm, wherein a protection plate is mounted below the lower knife at a location of each support arm, said protection plate adapted to be fittingly received in the corresponding recess in the spring element when the support arms are pivoted to a position for discharging the cut material strip.

15. Apparatus for cutting sheet-like material, such as metal, comprising a frame, a table for supporting a material plate to be cut, a fixed lower knife, an upper knife movable up-and-down and cooperating with the lower knife, said upper knife including a cutting angle with the lower knife, an adjustable stop for determining the width of a material strip to be cut and lifting means for lifting a fed part of the material plate, wherein said lifting means comprises a plurality of support arms distributed along the length of the apparatus, said support arms extending transverse to the lower knife and being adjacent to the lower knife with one end, the other end of each support arm being pivotably supported on a supporting beam, a pressure means being provided for each support arm, and said support arms during a cutting action each being pivotable downwards by the upper knife against the action of the corresponding pressure means while clamping the material strip to be cut, wherein the pivot axis of the pivot arms substantially lies at the height of the ends of the support arms when these support arms are in their lowest end position.

16. Apparatus according to claim 8, wherein the supporting beam is provided on both sides with pivot arms pivotably connected with the frame of the apparatus, wherein the supporting beam can be pivoted downwardly on both sides by an actuating means for discharging the cut material strip.

17. Apparatus according to claim 8, wherein the other end of each support arm is pivotably connected by a hinge pin with the supporting beam, wherein the hinge pins of the support arms lie at a distance below or above the upper side of the lower knife, which is at the utmost equal to the half of the cutting stroke of the upper knife.

18. Apparatus according to claim 8, wherein the pressure means of each support arm is made as a spring means, by which the corresponding support arm is supported on the supporting beam, wherein the support arms each are maintained in a substantially horizontal rest position by a stop element at tensioned spring means.

19. Apparatus according to claim 8, wherein the pressure means of each support arm comprises a double acting cylinder piston assembly mounted between said one end of the corresponding support arm and the frame.

* * * * *